US011973434B2

(12) United States Patent
Hensler et al.

(10) Patent No.: US 11,973,434 B2
(45) Date of Patent: Apr. 30, 2024

(54) CLAMPING CIRCUIT IN A RECTIFIER WITH MORE THAN TWO POTENTIALS PROVIDED ON THE OUTPUT SIDE

(71) Applicant: Siemens Aktiengesellschaft, Munich (DE)

(72) Inventors: Alexander Hensler, Gerhardshofen (DE); Philipp Oschmann, Erlangen (DE); Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 17/763,079

(22) PCT Filed: Aug. 6, 2020

(86) PCT No.: PCT/EP2020/072082
§ 371 (c)(1),
(2) Date: Mar. 23, 2022

(87) PCT Pub. No.: WO2021/058187
PCT Pub. Date: Apr. 1, 2021

(65) Prior Publication Data
US 2022/0407434 A1    Dec. 22, 2022

(30) Foreign Application Priority Data
Sep. 24, 2019   (EP) .................... 19199206

(51) Int. Cl.
*H02M 7/219* (2006.01)
*H02M 1/12* (2006.01)
*H02M 1/34* (2007.01)
(52) U.S. Cl.
CPC ........... *H02M 7/219* (2013.01); *H02M 1/123* (2021.05); *H02M 1/34* (2013.01)

(58) Field of Classification Search
CPC ........ H02M 7/219; H02M 1/123; H02M 1/34; H02M 1/44
See application file for complete search history.

(56) References Cited

U.S. PATENT DOCUMENTS 10,594,227 B1 * 3/2020 Blasko .................... H02P 27/16
2011/0116259 A1 * 5/2011 Plonski ................... A47F 11/06
362/231

(Continued)

FOREIGN PATENT DOCUMENTS

| DE | 102010008426 A1 | 8/2011 |
| DE | 102012005622 A1 | 9/2013 |
| DE | 102013112538 A1 | 5/2015 |

OTHER PUBLICATIONS

Hammerschmidt, Christoph: "Soft switching: Better efficiency for high power inverters"; Hochschule Konstanz; XP002798481; URL: https://www.eenewspower.com/news/softswitching-better-efficiency-high-power-inverters; 2016.

(Continued)

*Primary Examiner* — Adolf D Berhane
*Assistant Examiner* — Afework S Demisse
(74) *Attorney, Agent, or Firm* — Henry M. Feiereisen LLC

(57) ABSTRACT

A rectifier has at least three outputs at which the rectifier provides a high potential, a low potential and at least one medium potential. Phase voltages of a supply grid can be supplied to the rectifier via feed lines. Inductors are arranged in the feed lines. A clamping circuit has two diode circuits that are connected in series. One of the end points of the series circuit is connected to an output at which the rectifier provides one of the medium potentials. The other end point is connected to another output. The node is connected to a reference potential via an overall capacitor circuit.

2 Claims, 6 Drawing Sheets

(56) References Cited

U.S. PATENT DOCUMENTS

2012/0307533 A1   12/2012  Gekeler et al.
2015/0103570 A1    4/2015  Marahrens
2016/0254783 A1    9/2016  Unru et al.
2022/0109381 A1*  4/2022  Yenduri .............. H02M 7/4807

OTHER PUBLICATIONS

PCT International Search Report and Written Opinion of International Searching Authority dated Oct. 1, 2022 corresponding to PCT International Application No. PCT/EP2020/072082 filed Jun. 8, 2020.

* cited by examiner

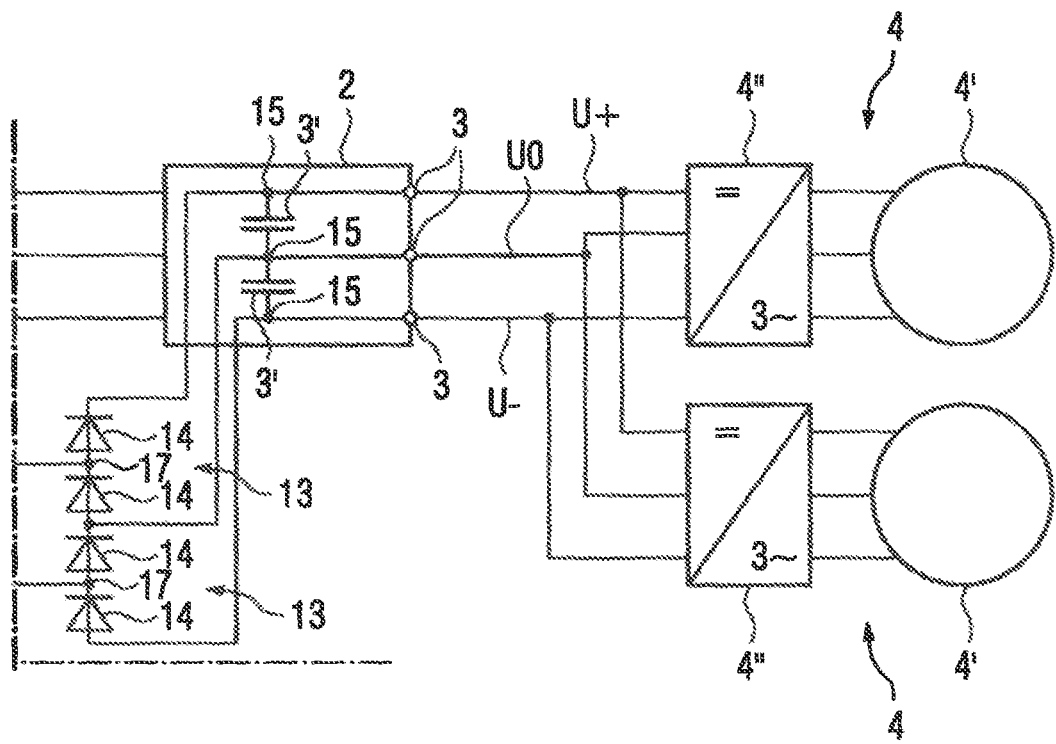

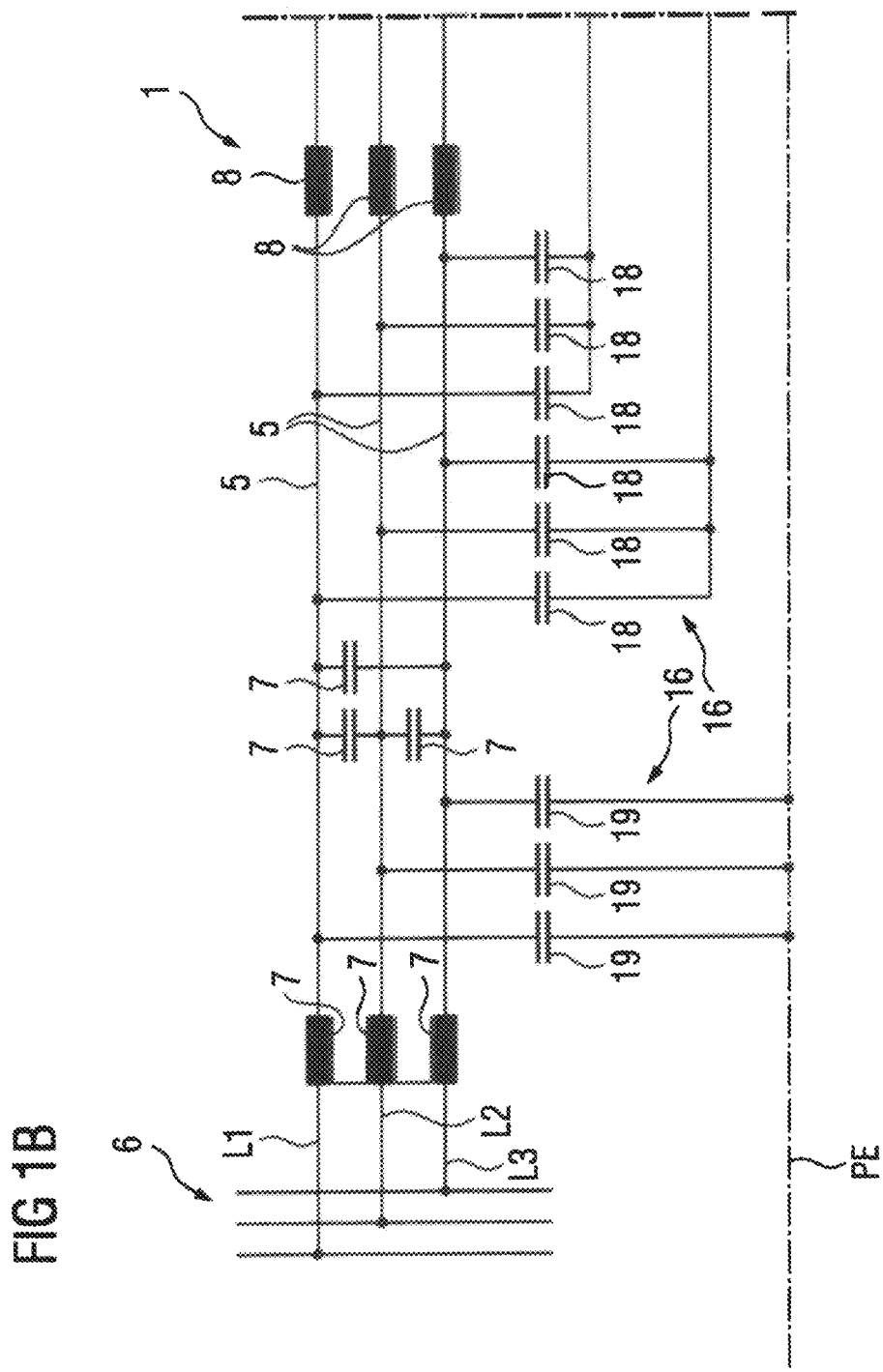

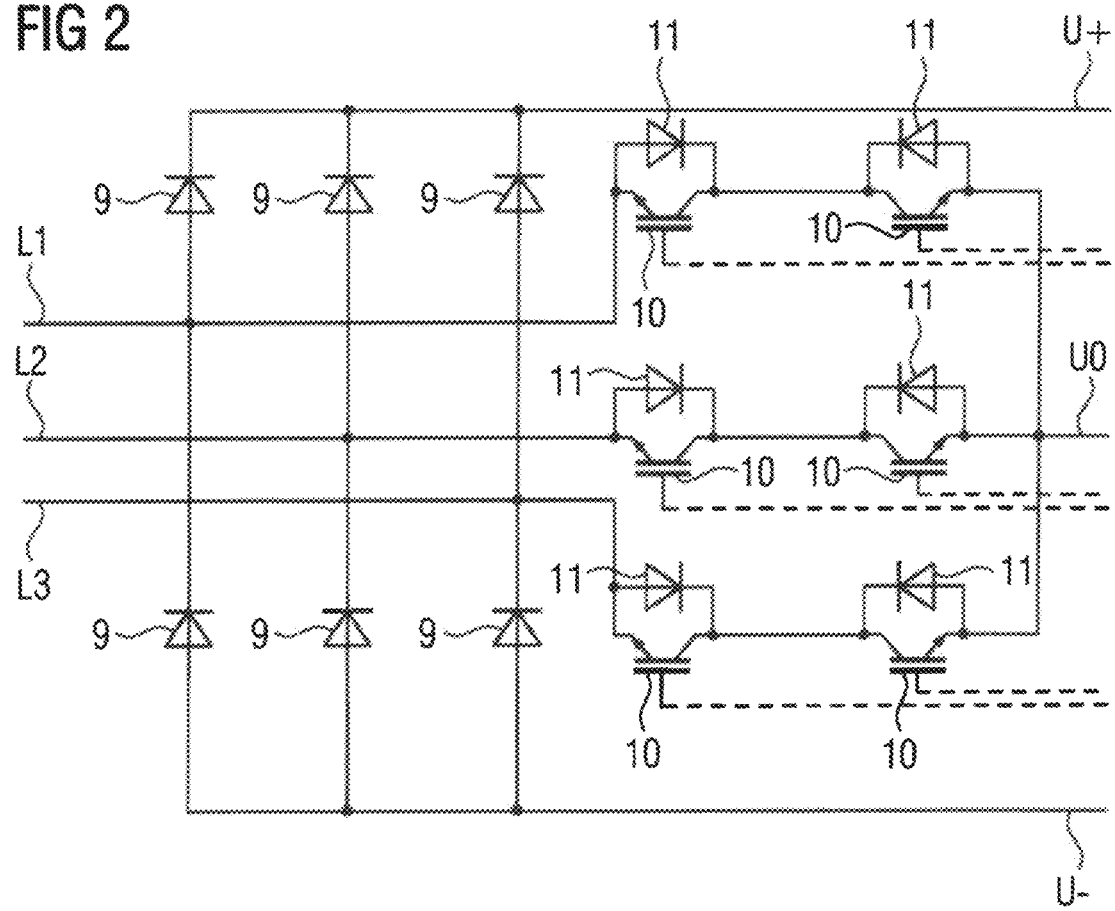

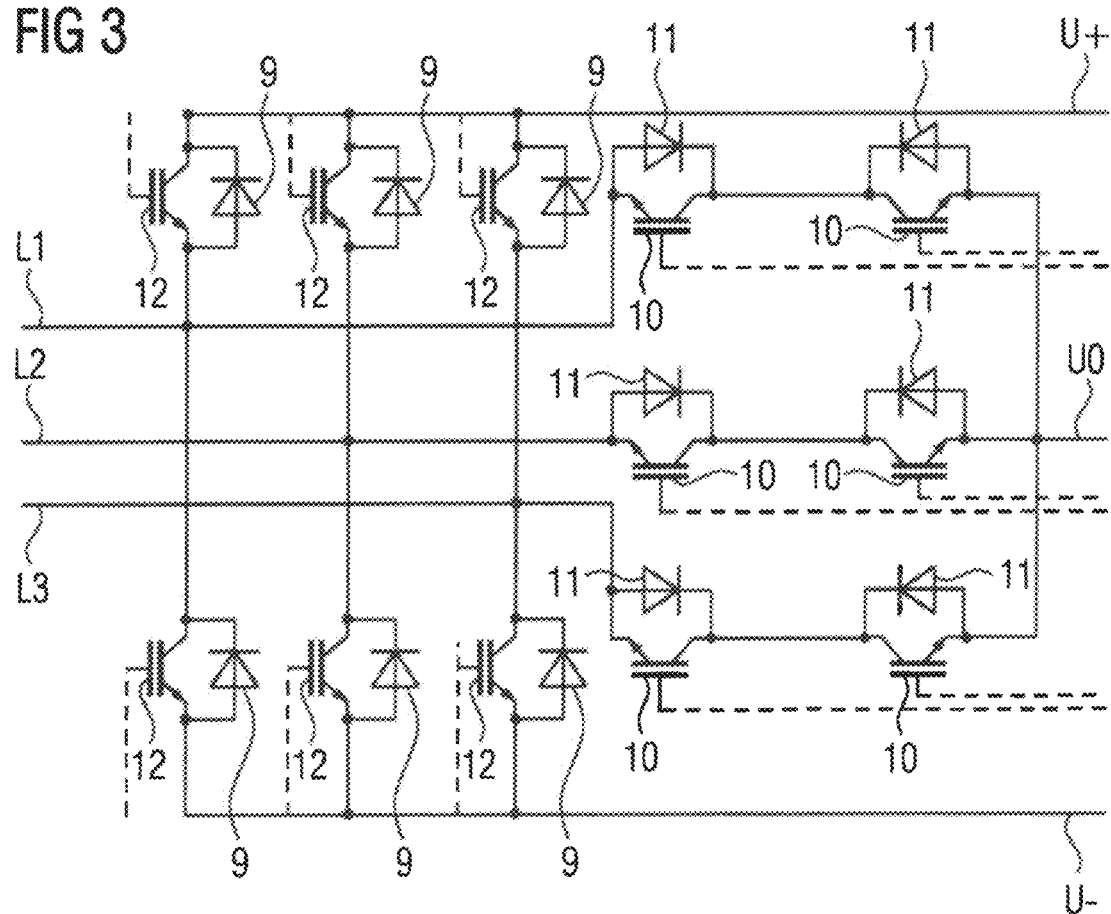

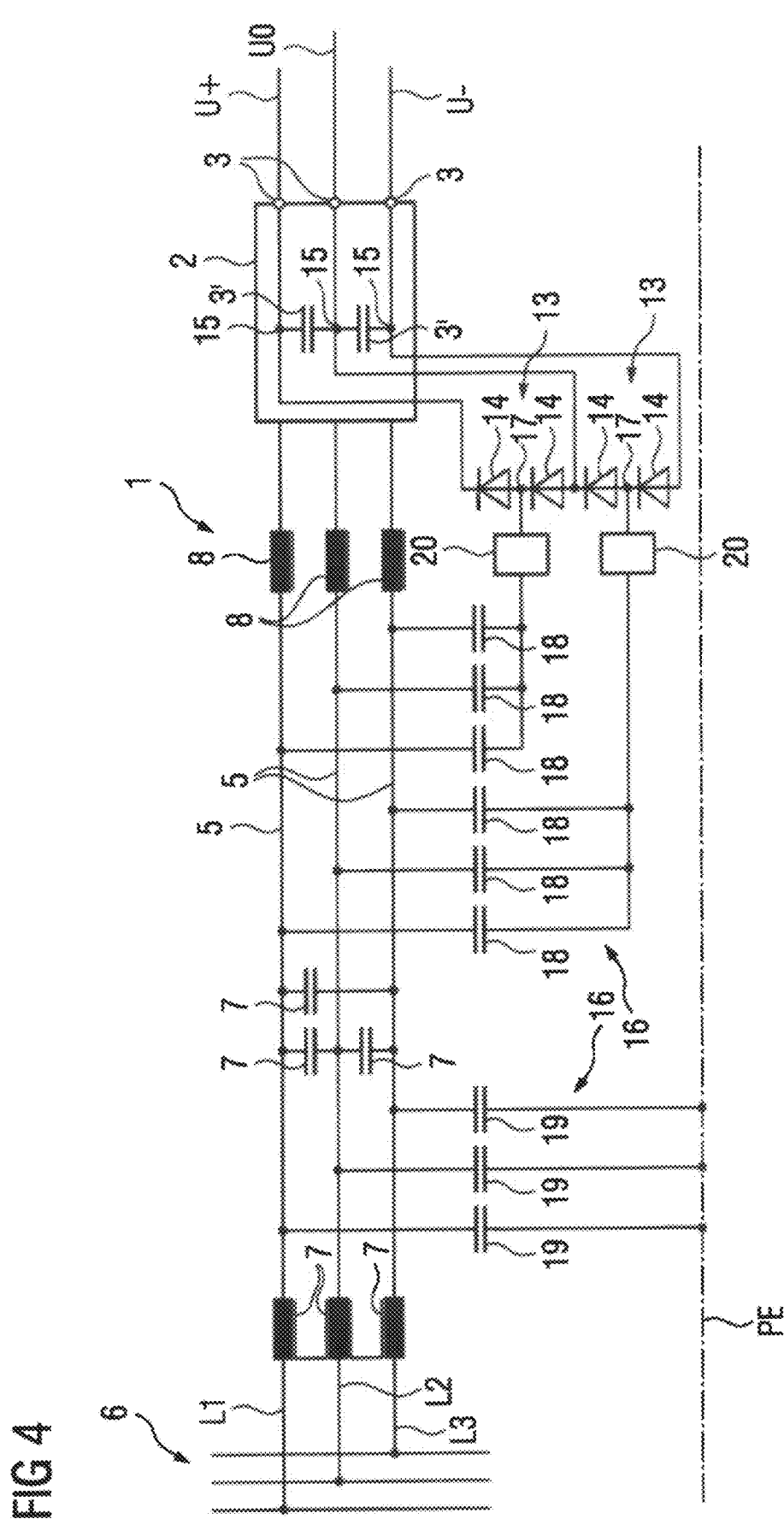

CLAMPING CIRCUIT IN A RECTIFIER WITH MORE THAN TWO POTENTIALS PROVIDED ON THE OUTPUT SIDE

CROSS-REFERENCES TO RELATED APPLICATIONS

This application is the U.S. National Stage of international Application No. PCT/EP2020/072082, filed Aug. 6, 2020, which designated the United States and has been published as International Publication No. WO 2021/058187 A1 and which claims the priority of European Patent Application, Serial No. 19199206.4, filed Sep. 24, 2019, pursuant to 36 U.S.C. 119(a)-(d).

BACKGROUND OF THE INVENTION

The present invention is based on a rectifier circuit,
wherein the rectifier circuit has a rectifier,
wherein the rectifier has at least three outputs at each of which the rectifier in each case provides a potential,
wherein one of the potentials provided is a high potential, which is higher than all the other potentials provided,
wherein a further one of the potentials provided is a low potential, which is lower than all the other potentials provided,
wherein, with the exception of the high potential and the low potential, the potentials provided are medium potentials that lie between the high potential and the low potential,
wherein the rectifier circuit has a plurality of feed lines via which in each case a phase voltage of a supply network can be supplied to the rectifier,
wherein the rectifier circuit has inductors arranged in the feed lines.

Rectifier circuits of this kind are generally known.

For example, so-called Vienna rectifiers are known. A Vienna rectifier has a bridge rectifier with rectifying elements embodied as diodes. The bridge rectifier provides the high potential and the low potential. Furthermore, the phase voltages within the Vienna rectifier are connected to the output for the medium potential via a respective bidirectionally switchable switching device. The respective bidirectionally switchable switching device can, for example, be embodied as a series circuit of two semiconductor switching elements, for example bipolar or field effect transistors.

Furthermore, so-called 3L rectifiers (3L stands for 3-level) are known. A 3L rectifier has a bridge rectifier with rectifying elements embodied as switchable elements (usually transistors). Furthermore, the phase voltages within the 3L rectifier are connected to the output for the medium potential via bidirectionally switchable switching devices.

Furthermore, multilevel rectifiers are also known, i.e., rectifiers that provide more than three potentials on the output side.

The rectifier circuit often feeds an intermediate circuit from which in turn loads are fed. For example, electrical drives can be fed with alternating current of variable amplitude and variable frequency via frequency converters. During operation of the loads, radio-frequency interference can, for example, occur in the lines from the rectifier circuit to the loads, and this interference can in turn have repercussions on the rectifier circuit and also on the connected loads. For example, the lines from the rectifier circuit to the loads form parasitic capacitances which can resonate in conjunction with the input-side inductors of the rectifier circuit. This can cause a so-called common-mode current, which is often only insufficiently damped due to the losses in the inductors. This can result in a voltage overshoot between the DC link and the reference potential (for example, ground). However, regardless of the type of interference, the interference is often disadvantageous and should be suppressed as far as possible or at least kept low.

In the prior art, passive damping is often used for stronger damping of the common-mode current. For this purpose, auxiliary windings are assigned to the input-side inductors of the rectifier circuit. The auxiliary windings are connected in series to one another and to a resistor. The auxiliary windings only damp the common-mode oscillations. One disadvantage of this solution is the relatively high power losses, which can lead to reduced efficiency and to problems in dissipating the heat that occurs. Another disadvantage is the relatively high cost.

Furthermore, in the prior art, a so-called clamping circuit is known for 2L rectifiers—i.e., for rectifiers in which the rectifier has exactly two outputs at which the rectifier provides a high potential and a low potential. This clamping circuit has a series circuit of two diode circuits so that the series circuit has a node arranged between the two diode circuits and two end points. One of the two end points is connected to one of the two outputs of the rectifier. The node is connected to a reference potential via an overall capacitor circuit of the clamping circuit. The clamping circuit limits jumping of the high potential and the low potential relative to the reference potential to half the potential difference between the high potential and the low potential.

It is the object of the present invention to develop a rectifier circuit of the type mentioned in the introduction such that interference, in particular a common-mode current, can be reduced and suppressed as far as possible for as little outlay as possible.

SUMMARY OF THE INVENTION

The object is achieved by a rectifier circuit as set forth hereinafter. Advantageous embodiments of the rectifier circuit are set forth in dependent claims.

According to the invention, a rectifier circuit of the type mentioned in the introduction is embodied such
that the rectifier circuit has at least one clamping circuit,
that the clamping circuit has a series circuit of two diode circuits so that the series circuit has a node arranged between the two diode circuits and two end points,
that one of the end points is connected to one of the outputs at which the rectifier provides one of the medium potentials,
that the other end point is connected to another one of the outputs and
that the clamping circuit has an overall capacitor circuit via which the node is connected to a reference potential.

The rectifier circuit is therefore basically supplemented by a clamping circuit, as is known for a 2L rectifier. However, the end points of the diode circuit of the clamping circuit are not connected to the outputs for the high potential and the low potential, but to one of the outputs at which the rectifier provides one of the medium potentials and to a further output. Although the further output can be one of the two outputs at which the rectifier provides the high potential and the low potential. At least one of the two outputs that are connected to one another via the clamping circuit is different from these two outputs. The potential difference bridged by the clamping circuit is therefore lower than the potential difference between the high potential and the low potential.

The clamping circuit limits jumping of the potentials provided by the rectifier circuit (including the high potential and the low potential) relative to the reference potential to half the potential difference between the two potentials of the two outputs that are connected to one another via the diode circuit of the clamping circuit.

In a preferred embodiment, it is provided that the overall capacitor circuit has at least one series circuit consisting of two partial capacitor circuits, that one partial capacitor circuit connects the node to a line section of one of the feed lines, that the other partial capacitor circuit connects the same line section to the reference potential and that the inductor arranged in the corresponding feed line is arranged between the rectifier and the line section.

This embodiment takes advantage of the fact that the partial capacitor circuit that connects a line section to the reference potential is often already present for other reasons. In particular, it has the advantage that only one single interface connection to the reference potential is required within the rectifier circuit. Otherwise, two interface connections would exist, which in turn can often lead to problems.

It is possible for the overall capacitor circuit to be connected directly, i.e., without intermediate elements, to the node between the two diode circuits. However, it is preferably provided, that the clamping circuit has a circuit network, that the circuit network is arranged between the node and the overall capacitor circuit and that the circuit network has a varistor with or without a resistor connected in series, a Zener diode with or without a resistor connected in series, a damping resistor or a series circuit of a resistor and a capacitor with or without a resistor bridging the capacitor.

This embodiment in particular enables fine tuning of the behavior of the clamping circuit and a reduction of the current flowing through the clamping circuit.

BRIEF DESCRIPTION OF THE DRAWING

The above-described properties, features and advantages of this invention and the manner in which these are achieved will become clearer and more plainly comprehensible in conjunction with the following description of the exemplary embodiments, which are explained in more detail in conjunction with the drawings. The drawing show in schematic form:

FIG. 1 a rectifier circuit and supplementary components,
FIG. 2 a possible embodiment of a rectifier,
FIG. 3 a further possible embodiment of a rectifier,
FIG. 4 a modification of the rectifier circuit in FIG. 1, and
FIG. 5 possible embodiments of a circuit network.

DETAILED DESCRIPTION OF PREFERRED EMBODIMENTS

Figure 5:
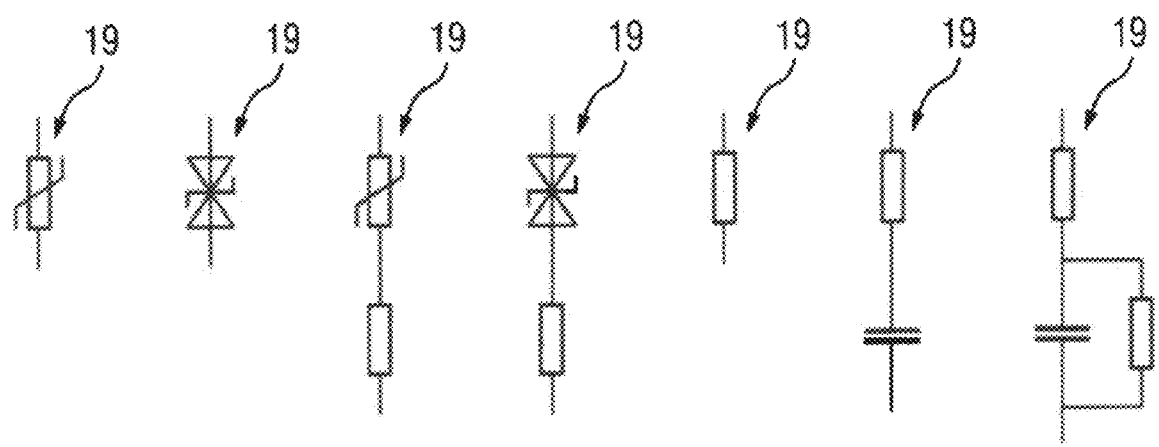

According to FIG. 1, a rectifier circuit 1 has a rectifier 2. The rectifier 2 has at least three outputs 3. The outputs 3 are usually connected to one another via backup capacitors 3'. At each of the outputs 3, the rectifier 2 in each case provides a potential U+, U0, U−. The potentials provided U+, U0, U− are DC potentials. The potential U+ is the highest potential provided by the rectifier 2. In the following, it is referred to as high potential U+. The potential U− is the lowest potential provided by the rectifier 2. In the following, it is referred to as low potential U−. All other potentials U0 provided by the rectifier 2—here only one single potential U0—lie between the high potential U+ and the low potential U−. In the following, they are referred to as medium potentials U0.

The potentials U+, U0, U− are supplied to loads 4. The loads 4 can, for example, each be embodied in accordance with the depiction in FIG. 1 as electrical machines 4' each of which is fed via a frequency converter 4". However, the loads 4 can also be embodied differently. The loads 4 are not a subject of the present invention.

The rectifier circuit 1 has a plurality of feed lines 5. Phase voltages L1, L2, L3 of a supply network 6 are supplied to the rectifier 2 via the feed lines 5. Filter elements 7 are arranged in the feed lines 5 toward the supply network 6. The filter elements 7 can be embodied as inductors or comprise inductors. The supply network 6 and the filter elements 7 are not as such a subject of the present invention. Furthermore, inductors 8 are arranged in the feed lines 5. The phase voltages L1, L2, L3 supplied to the rectifier 2 are thus supplied to the rectifier 2 via the respective inductor 8. The inductors 8 are part of the rectifier circuit 1.

Various embodiments are possible for the internal embodiment of the rectifier 2. The following explains possible embodiments for the most common case in which the rectifier 2 only provides one single medium potential U0 in addition to the high potential and the low potential U+, U−.

In this case, the rectifier 2 can, for example, have diodes 9 in accordance with the depiction in FIG. 2. The diodes 9 rectify the phase voltages L1, L2, L3 supplied to the rectifier 2. In this way, the high potential and the low potential U+, U− are generated. Furthermore, the rectifier 2 has bidirectionally acting electronic switching devices. The electronic switching devices usually have two electronic switches 10 connected in series, for example IGBTs or FETs, in accordance with the depiction in FIG. 2. Optionally, diodes 11 can be connected in parallel with the electronic switches 10. Alternatively, the diodes 11 can be independent components or intrinsic elements of the electronic switches 10. The electronic switching devices provide the medium potential U0 following a corresponding actuation.

Alternatively, the rectifier 2 can have electronic switches 12 instead of the diodes 9 or in parallel with the diodes 9 in accordance with the depiction in FIG. 3, for example IGBTs or FETs. If still present, the diodes 9 can alternatively be independent components or intrinsic elements of the electronic switches 12. Following a corresponding actuation, the electronic switches 12 provide the high potential and the low potential U+, U−. Furthermore—similarly to the case in FIG. 2—the electronic switching devices by means of which the medium potential U0 is provided are present.

The circuit design and operation of the rectifiers 2 in FIGS. 2 and 3 are generally known to those skilled in the art. Therefore, no detailed explanations of these are required.

According to FIG. 1, the rectifier circuit 1 furthermore has a number of clamping circuits 13. One single clamping circuit 13 is present as a minimum. However, it is also possible for a plurality of clamping circuits 13 to be present. In particular, in accordance with the depiction in FIG. 1, one clamping circuit 13 can be present for each two successive potentials provided U+, U0 or U0, U−. If a plurality of clamping circuits 13 are present, they are generally embodied identically to one another. Therefore, only one of the clamping circuits 13 is explained in more detail in the following.

The clamping circuit 13 has a series circuit of two diode circuits 14. The two diode circuits 14 of the clamping circuit 13 can in each case be individual diodes or series circuits or parallel circuits of diodes.

End points 15 of said series circuit are each connected to an output 3 at which the rectifier 2 provides one of the potentials U+, U0, U−. One of the outputs 3 is the output 3 at which the rectifier 2 provides the medium potential U0. A further one of the outputs 3 is the output 3 at which the rectifier 2 provides the high potential U+ or the low potential U−. In the case of the embodiment according to FIG. 1, in which the rectifier 2 provides exactly three potentials U+, U0, U− in total, this is necessarily the case. If the rectifier 2 has more than three outputs 3 and consequently also provides more than three potentials U+, U0, U−, this can likewise be the case. However, if the rectifier 2 has more than three outputs 3 and consequently also provides more than three potentials U+, U0, U−, the series circuit of the diode circuits 14 can also interconnect two outputs 3 which provide two medium potentials U0 that are different from one another. The two outputs 3, which are connected to one another via the series circuit of the diode circuits 14 preferably provide directly adjacent potentials U+, U0, U−. Therefore, the rectifier 2 preferably does not provide any potential lying between the two potentials U+, U0 or U0, U− of which the corresponding outputs 3 are connected to one another via the series circuit of the diode circuits 14.

The clamping circuit 11 furthermore has an overall capacitor circuit 16. The overall capacitor circuit 16 connects a node 17 to a reference potential PE, for example to ground or earth. The node 17 is in turn arranged between the two diode circuits 14.

It is possible for the overall capacitor circuit 16 to be directly connected to the reference potential PE. However, according to the depiction in FIG. 1, the overall capacitor circuit 16 has a number of series circuits, each of which in turn consists of two partial capacitor circuits 18, 19. One partial capacitor circuit 18 of a series circuit of this kind connects the node 17 to a line section of one of the feed lines 5. The other partial capacitor circuit 19 of a series circuit of this kind connects the same line section to the reference potential PE. The line section is selected such that the inductor 8 of the corresponding feed line 5 is arranged between the rectifier 2 and said line section.

The overall capacitor circuit 16 is generally embodied symmetrically in the sense that a series circuit of this kind, which in turn consists of two partial capacitor circuits 18, 19, is present for each phase voltage L1, L2, L3. However, this is not absolutely necessary.

In the simplest case, the overall capacitor circuit 16 is directly connected to the node 17. However, in accordance with the depiction in FIG. 4, it is alternatively possible for the clamping circuit 13 to have a circuit network 20. In this case, the circuit network 20 is arranged between the node 17 and the overall capacitor circuit 16. The circuit network 20 as such can be embodied in different ways. For example, in accordance with the depiction in FIG. 5, the circuit network 20 can alternatively have the following embodiments:

- It can be embodied as a varistor. As is generally known to those skilled in the art, a varistor is an electrical component whose resistance depends on the electrical voltage across the component. In particular, the differential resistance of the varistor decreases rapidly above a certain threshold voltage. The threshold voltage is in turn determined by the type and design of the varistor.
- It can be embodied as a varistor to which a resistor is connected in series.
- It can be embodied as a Zener diode.
- It can be embodied as a Zener diode to which a resistor is connected in series.
- It can be embodied as a damping resistor.
- It can be embodied as a series circuit of a resistor and a capacitor.
- It can be embodied as a series circuit of a resistor and a capacitor, wherein the capacitor is additionally bridged by a further resistor.

Thus, in summary, the present invention relates to the following subject matter:

A rectifier 2 has at least three outputs 3 at which the rectifier 2 provides a high potential U+, a low potential U− and at least one medium potential U0. Phase voltages L1, L2, L3 of a supply network 6 are supplied to the rectifier 2 via feed lines 5. Inductors 8 are arranged in the feed lines 5. A clamping circuit 13 has two diode circuits 14 that are connected in series. One of the end points 15 of the series circuit is connected to an output 3 at which the rectifier 2 provides one of the medium potentials U0. The other end point 15 is connected to another output 3. The node 17 is connected to a reference potential PE via an overall capacitor circuit 16.

The present invention has many advantages. The use of a rectifier circuit 1, which, in addition to the high potential U+ and the low potential U−, also provides the medium potential U0, significantly reduces the exciting common-mode voltage. Furthermore, the clamping circuit 13 can limit potential jumps to half the potential difference of the two potentials U+, U0 or U0, U− which can be connected to one another via the clamping circuit 13. This can in particular again significantly reduce the voltage load on the insulation of the electrical machines 4'. The solution is robust and inexpensive to implement. Most of the energy stored in the parasitic capacitances of the lines between the rectifier circuit 1 and the loads 4 is fed back into the DC link. This improves the efficiency of the overall circuit, in particular in the case of long lines of this type.

Although the invention has been illustrated and described in greater detail by the preferred exemplary embodiment, the invention is not restricted by the disclosed examples and other variations can be derived herefrom by the person skilled in the art without departing from the scope of protection of the invention.

What is claimed is:

1. A rectifier circuit, comprising:
   a rectifier including at least three outputs to provide potentials, respectively, with a first one of the potentials being a high potential, which is higher than all the other ones of the potentials, with a second one of the potentials being a low potential, which is lower than all the other ones of the potentials, and with a third one of the potentials being a medium potential that lies between the high potential and the low potential;
   a plurality of feed lines, each feed line designed to supply a phase voltage of a supply network to the rectifier;
   inductors arranged in the feed lines; and
   a clamping circuit comprising
      a series circuit of two diode circuits so that the series circuit includes a node arranged between the two diode circuits and two end points, with one of the end points being connected to one of the at least three outputs at which the rectifier provides the medium potential, and with the other end point being connected to another one of the at least three outputs, and
      an overall capacitor circuit via which the node is connected to a reference potential, said overall capacitor circuit including a series circuit comprising two partial capacitor circuits, with one of the two partial capacitor circuits connecting the node to a line section of one of the feed lines, and the other one of the two partial capacitor circuits connecting the line section to the reference potential, and with the inductor arranged in the corresponding one of the feed lines being arranged between the rectifier and the line section.

2. The rectifier circuit of claim 1, wherein the clamping circuit includes a circuit network arranged between the node and the overall capacitor circuit, said circuit network including a varistor with or without a resistor connected in series, a Zener diode with or without a resistor connected in series, a damping resistor or a series circuit of a resistor, and a capacitor with or without a resistor bridging the capacitor.

* * * * *